Aug. 2, 1955 A. F. KEISER 2,714,528
APPARATUS FOR SUPPLYING ATOMIZED THERMOPLASTIC
Filed June 1, 1951 3 Sheets-Sheet 1
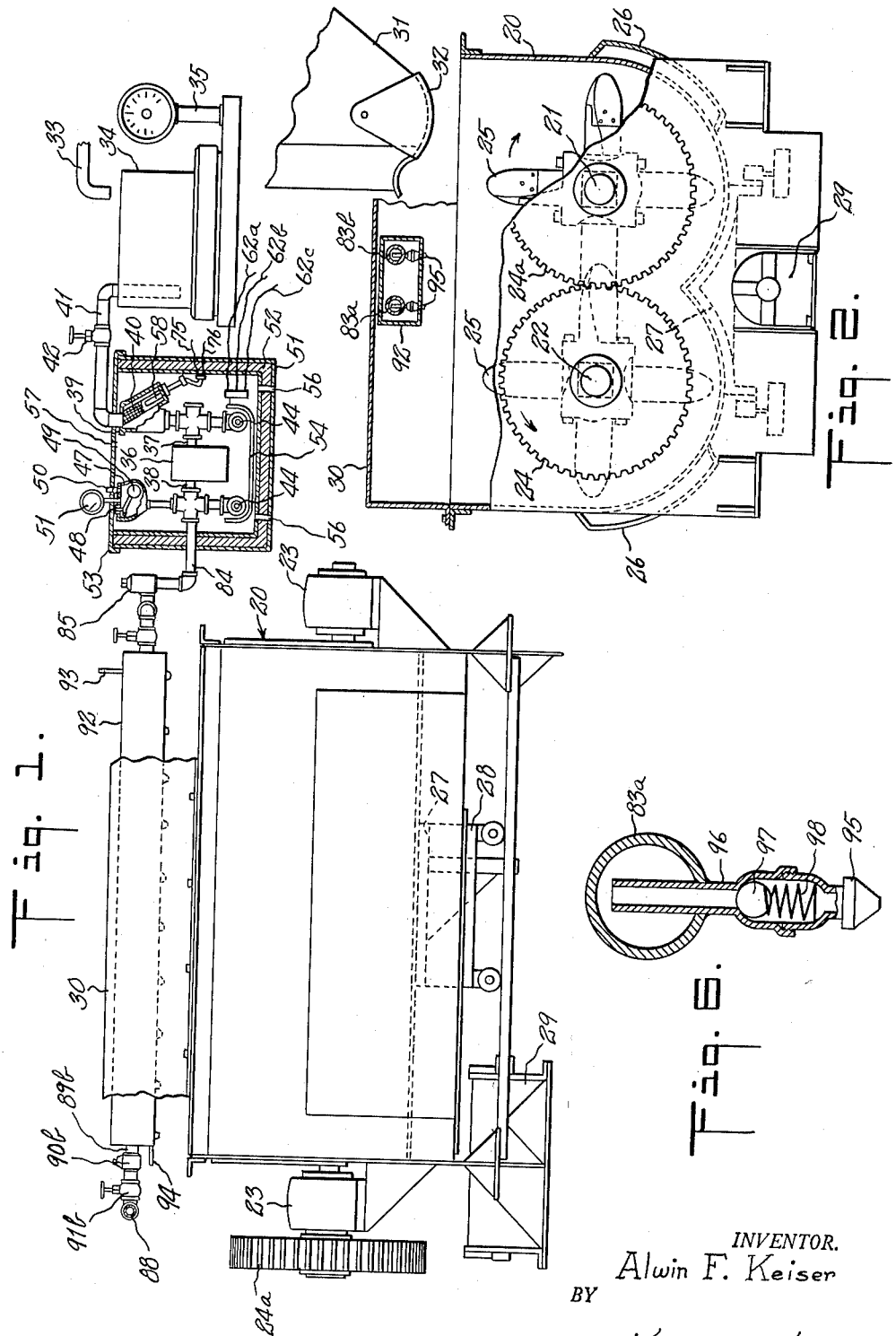
INVENTOR.
Alwin F. Keiser
BY
Kenyon & Kenyon
ATTORNEYS

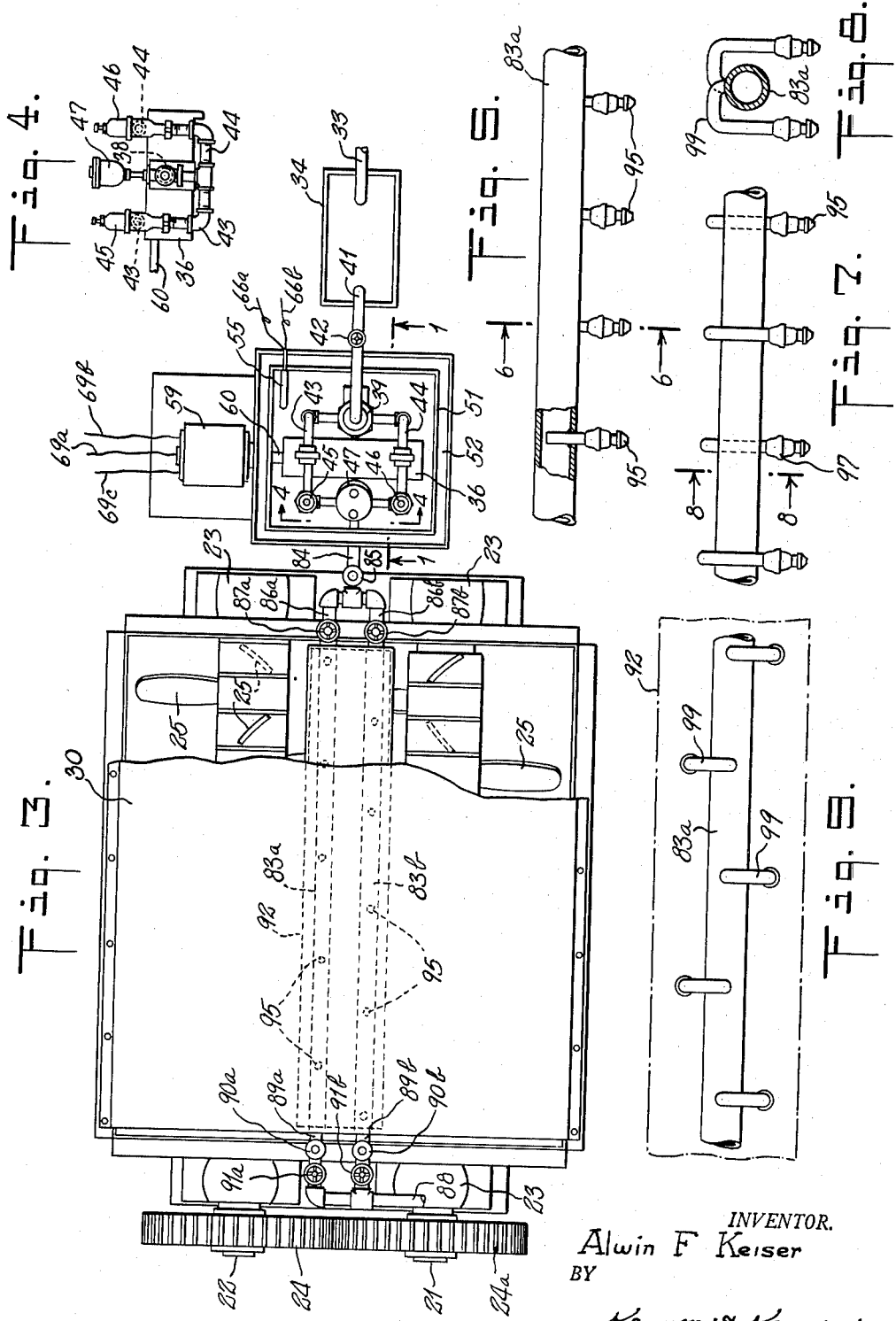

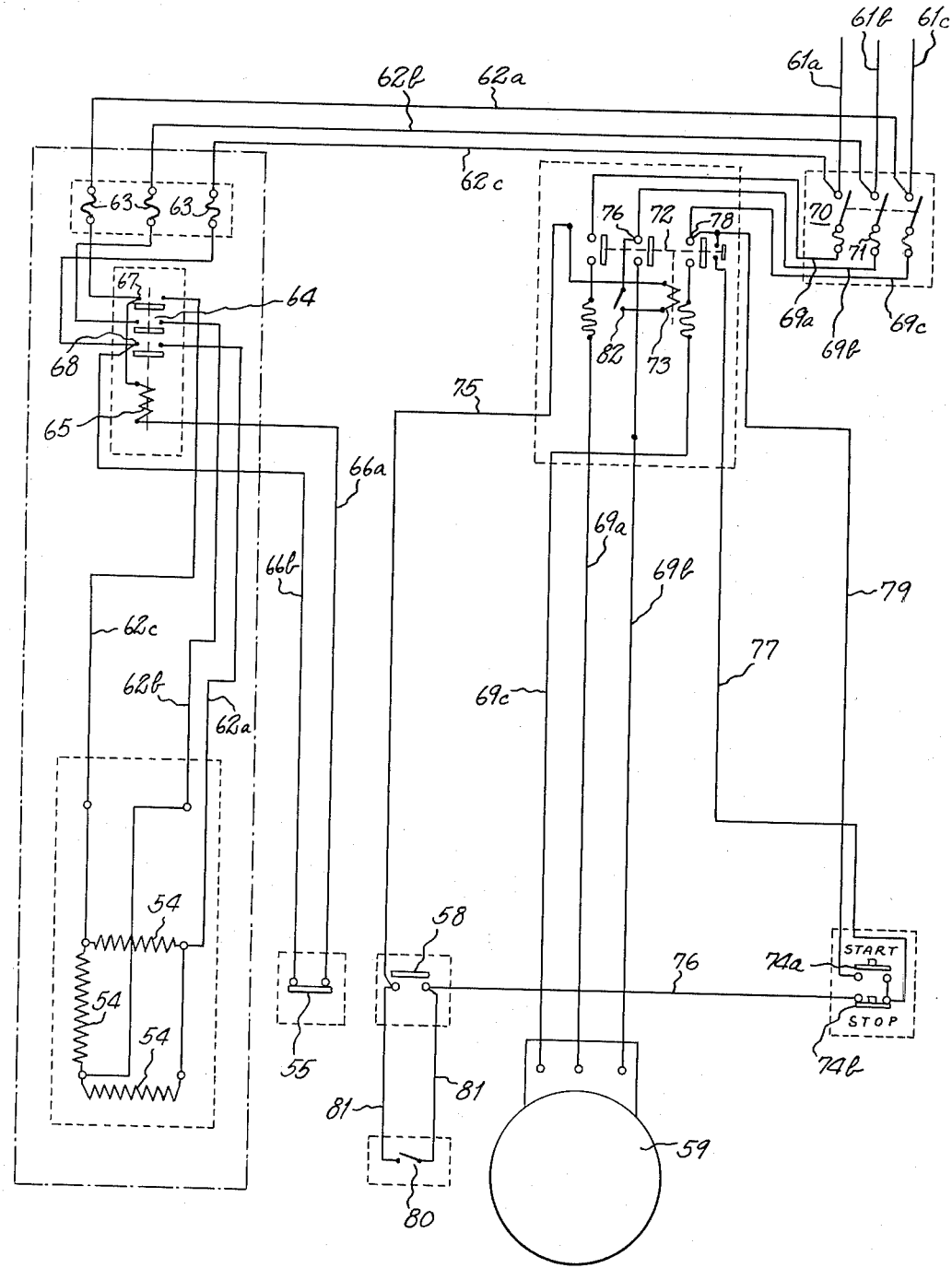

United States Patent Office 2,714,528
Patented Aug. 2, 1955

2,714,528

APPARATUS FOR SUPPLYING ATOMIZED THERMOPLASTIC

Alwin F. Keiser, New York, N. Y., assignor, by mesne assignments, to "Straba" Handels-Aktiengesellschaft, Zurich, Switzerland Application June 1, 1951, Serial No. 229,512

12 Claims. (Cl. 299—58)

This invention relates to apparatus for supplying atomized thermoplastic and relates especially to apparatus for supplying a thermoplastic such as paving asphalt in an atomized condition for application to paving aggregate or the like.

For certain purposes distinct advantages are afforded when a plastic material is applied to particulate solid material while the plastic material is in an atomized condition and while the solid particles are caused to occur in substantially discrete condition in an atmosphere containing the atomized plastic. Typical applications of the foregoing are disclosed in the Sommer patents Reissue No. 20,119 and Nos. 2,055,224; 2,125,860; and 2,445,928; and in the Sommer application Serial No. 26,753, filed May 13, 1948 (Patent No. 2,572,068), said application disclosing the coating of paving aggregate particles with paving asphalt by impact contact between the paving aggregate particles and heat liquefied paving asphalt reduced to an atomized condition.

In attempting to atomize a thermoplastic material such as paving asphalt special problems and difficulties are encountered. Paving asphalt which is generally used in making a pavement of the hot mixed type generally has a softening point of the order of 100° F. to 130° F. Even in connection with ordinary mixing operations wherein the asphalt is merely incorporated in a mixer in the form of an undispersed liquid for distribution over the surfaces of the aggregate particles by a kneading action, relatively high temperatures are employed of the order of 225° F. to 350° F. in order to permit the proper coating of the aggregate particles. While the asphalt is thermoplastic there are, however, limits to the extent to which the asphalt can be heated without causing harmful disintegration of the asphalt which renders it less suitable in the finished pavement. Accordingly, it is not desirable to heat the asphalt much above 350° F. At the temperatures to which the asphalt must be heated and at which it can be safely heated, the asphalt is much more difficult to reduce to an atomized condition as compared with a material which is freely fluid at ordinary atmospheric temperatures. In order to produce atomization of the heat liquefied asphalt relatively high pressures are required which for certain types of asphalt used in paving work may run as high as 300 pounds per square inch. In addition difficulties are encountered due to the thermoplastic characteristics of the asphalt inasmuch as proper correlation has to be maintained between the temperature of the asphalt and the pressure to which it is subjected. Moreover, the thermoplastic characteristics of the asphalt occasions difficulties due to the fact that it tends to become reduced to a solid or semi-solid condition when parts of the apparatus handling the asphalt become cooled during periods when the discharge of atomized asphalt is not continuously maintained. Most paving operations are carried out in batches and if atomized asphalt is used, it is supplied intermittently with the result that short periods occur during normal operation when the supply of atomized asphalt is shut off; and there are, of course, longer periods of shut down when the apparatus is not in use, such as overnight. Especially after a substantial period of shut down it is difficult to free the apparatus for handling the hot asphalt so that it will function in its intended manner, and unless precautions are taken there may be severe damage to the apparatus if attempt is made to start operation prematurely. In addition to the above it is normally desirable to control as exactly as possible the charge of asphalt that is used and the viscous character of a material such as asphalt renders this difficult. It is also difficult to handle material such as asphalt so as to avoid conditions such that there is improper atomization of the asphalt, especially at the beginning and at the end of the period during which a charge of asphalt is supplied for application to aggregate material.

It is an object of this invention to provide novel and effective means for applying a thermoplastic material such as asphalt in an atomized condition while avoiding or minimizing the difficulties and problems that have been referred to hereinabove. More particularly it is an object of this invention to provide means whereby a proper correlation between temperature and pressure can be maintained and whereby asphalt may be atomized in accurately controlled amounts and with thorough atomization of the amount of asphalt employed.

This invention involves several features which preferably are all employed in combination, but which individually constitute improvements in apparatus of the type under consideration herein.

Certain features of this invention relate to novel means for maintaining a supply of heat liquefied asphalt under high pressure for supply to the atomizer nozzles. In connection with this aspect of the invention features thereof involve the use of a positive displacement rotary pump, preferably a gear pump, in combination with other structural features among which may be mentioned a by-pass line between the outlet and inlet of the pump controlled by a pressure relief valve, as well as an air trap and an air vent and preferably, as well, a strainer. Further features of the invention relate to the provision of the combined structural features so as to provide a compact unit, and to the provision of a common casing about such structural features together with means for elevating the temperature of the atmosphere within the casing and for controlling such temperature and preferably in further combination with means for controlling the operation of the mechanisms in response to the temperature of the asphalt being handled.

Further features of this invention relate to the manifold means which carries the spray nozzles, including the means for effecting immediate response to a charge of asphalt for accomplishing atomization. Moreover, further features of the invention relate to means whereby a charge of asphalt can be accurately controlled as to amount and whereby dripping of unatomized asphalt from the atomizer nozzles is minimized or prevented. Further features of this invention relate to means for keeping the nozzle-carrying manifold and the atomizer nozzles clear of asphalt during periods of shutdown.

Further objects, features and advantages of this invention will be apparent in connection with the following description of certain illustrative embodiments of this invention in connection with the accompanying drawings, wherein Fig. 1 is a side elevation of apparatus embodying the invention with part thereof in section along the line 1—1 of Fig. 3 and with a portion of the air trap and strainer container broken away to show detail;

Fig. 2 is an end view of the apparatus of Fig. 1 partly broken away to show certain parts in section;

Fig. 3 is a plan view of the apparatus;

Fig. 4 is an elevational detail view partly in section of a portion of the apparatus of Figs. 1 and 2 taken from the line 4—4 of Fig. 3;

Fig. 5 is a side elevation on an enlarged scale of a portion of one of the nozzle-carrying manifolds of the apparatus with part broken away to show the interior construction;

Fig. 6 is a sectional view taken on the line 6—6 of Fig. 5;

Fig. 7 is a side elevation similar to Fig. 5 of an alternative nozzle-carrying manifold construction;

Fig. 8 is a section taken on the line 8—8 of Fig. 7;

Fig. 9 is a plan view of the nozzle-carrying manifold construction shown in Fig. 7; and Fig. 10 is a wiring diagram of a typical control circuit for the apparatus.

In the accompanying drawings applicant's invention has been illustrated for exemplary purposes as applicable to the atomization of heat liquefied paving asphalt for coating aggregate particles contained in a mixer. The mixer as such is not part of this invention and it is to be understood that any type of mixer, whether conventional or otherwise, may be employed. The mixer is indicated generally by the reference character 20 and the mixer which is shown in the drawings is of the twin shaft type. The shafts 21 and 22 are carried by suitable bearings 23 for rotation in the directions indicated by the arrows in Fig. 2 under the influence of the intermeshing gears 24 and 24a which are fixed to the shafts 21 and 22. The shafts may be rotated from any suitable source of power (not shown). The mixer blades 25 are rotatable with the shafts 21 and 22 and when rotated in the directions indicated serve to thoroughly agitate particles of aggregate contained in the mixer and to throw the aggregate particles in the center portion of the mixer upwardly in such a way as to be in substantially discrete condition for a brief period of time in the upper portion of the mixer between the mixer blades. The bottom of the mixer is preferably curved as shown so as to conform to the sweep of the tips of the mixer blades thus giving the mixer blades a good grip on the aggregate contained in the mixer, and the mixer may be optionally supplied with jacket means 26 adapted to contain a heating fluid such as steam so as to maintain the contents of the mixer at desired temperature. The bottom of the mixer is provided with a gate 27 which is carried by the movable car 28 so that the contents of the mixer may be quickly discharged by moving the gate from closed position by suitable means such as the air cylinder 29 that is operatively connected to the car 28 for moving the gate between open and closed positions. It is preferable that the upper portion of the mixer be provided with a cover 30. The mixer may be charged with the aggregate to be coated by any suitable means such as the weighing hopper 31 whose outlet is controlled by the gate 32. The mixer is preferably the type wherein the mixing blades are inclined so that the aggregate will be moved in one direction relative to the axis of one of the shafts and will be moved in the opposite direction relative to the other shaft so as to produce a circulatory movement of the aggregate within the mixer.

While a mixer such as that above described can be used in connection with any method for applying heat liquefied paving asphalt to the aggregate particles improved coating can be afforded by atomizing the heat liquefied asphalt into the atmosphere in the upper portion of the mixer wherein the aggregate particles are thrown upwardly in substantially discrete condition by the action of the mixer blades in the region between the mixer blades. In carrying out such an operation it is the objective to discharge the heat liquefied paving asphalt from the atomizer nozzles in a highly atomized condition and in a predetermined amount for application to the weighed amount of the aggregate contained in the mixer. It is also an objective to effect the application of the atomized asphalt of the aggregate in a short period of time and in such manner that essentially all of the heat liquefied asphalt will be introduced in a highly atomized condition. The improved means for supplying the heat liquefied asphalt according to this invention will first be described in connection with the embodiment of this invention shown in Figs. 1 to 6 and 10.

The asphalt which is to be atomized using the apparatus of this invention may be supplied from any suitable source of this invention in a heat liquefied condition through the line 33 for introduction into the weigh bucket 34. Any suitable means for weighing the heat liquefied asphalt contained in the weigh bucket 34 may be provided such as the scale 35. By weighing the weigh bucket 34 when the weigh bucket is charged with heat liquefied asphalt the weight of the heat liquefied asphalt withdrawn therefrom can be measured and the withdrawal can be stopped by the means disclosed below when the desired predetermined weight of heat liquefied asphalt has been withdrawn from the weigh bucket.

The heat liquefied asphalt is taken from the weigh bucket 34 to the portion of the apparatus which supplies the heat liquefied asphalt to the manifold for the spray nozzles under high pressure, and this portion of the apparatus will now be described. The heat liquefied asphalt is subjected to high pressure by a rotary positive displacement pump 36 which preferably is of the gear type. Such pumps are well known per se and for this reason the pump 36 is indicated merely diagrammatically in the drawings. The gear pump 36 is provided with an inlet 37 and an outlet 38. Adjacent and communicating with the inlet 37 is the container 39 within which is disposed a strainer 40. The line 41 communicates, as shown, from adjacent the bottom of the weigh bucket 34 to the container 39 and directs the heat liquefied asphalt through the strainer 40 before the heat liquefied asphalt in the container 39 passes therefrom through the inlet 37 into the gear pump 36. The line 41 is controlled by the valve 42 which is preferably of a quick acting type so that it can be opened and closed quickly.

Communicating between the outlet 38 of the gear pump 36 and the inlet 37 of the gear pump are by-pass lines 43 and 44 which are arranged in parallel as shown in Figs. 1, 3 and 4. A pressure relief valve 45 is disposed in the by-pass line 43 and a pressure relief valve 46 is disposed in the by-pass line 44 so as to maintain a predetermined back pressure on the high pressure side of the pump 36. Preferably these relief valves are adjustable so that any desired predetermined pressure can be maintained by each valve and so that the back pressure maintainable by one of the valves will be somewhat higher than that maintainable by the other valve. For example, if the predetermined back pressure to be maintained is 300 pounds per square inch, the pressure relief valve 45 in the by-pass line 43 may be set to maintain this pressure. The pressure relief valve 46 in the by-pass line 44 may then be set so as to maintain a back pressure of 325 pounds per square inch. Because the by-pass lines 43 and 44 communicate between the outlet and inlet of the gear pump 36 the gear pump 36 may be continuously operated regardless of the withdrawal or rate of withdrawal of heat liquefied asphalt from the outlet of the gear pump to the manifold for the atomizer nozzles. When the pressure relief valves 45 and 46 are set for different back pressures the one which is set for the lower back pressure will be controlling in regulating a constant back pressure at the outlet of the gear pump 36 and the discharge from the gear pump will be recirculated from the outlet to the inlet of the gear pump during operation of the gear pump through the by-pass line containing the pressure relief valve which is set for the lower pressure. However, if there should be some failure in the functioning of the pressure relief valve set for maintaining the lower back pressure or if there should be some stoppage in the by-pass line containing this pressure relief valve, the pressure produced by the pump will rise until the pressure corresponds to the higher pressure setting of the pressure relief valve in the second by-pass line whereupon the second by-pass line will function to recirculate the heat liquefied asphalt from the outlet to the inlet of the gear pump, thus preventing any damage to the apparatus. Moreover, the increase in pressure resulting under such circumstances would immediately be apparent and would indicate that the apparatus was not functioning properly, thus permitting the difficulty to be remedied and the proper functioning of the apparatus to be restored before any damage to the apparatus can occur.

Adjacent the outlet 38 of the gear pump 36 there is an air trap 47. The air trap communicates with the outlet of the gear pump 36 at a point which preferably is as close to the outlet of the gear pump as the point of egress from the outlet 38 at which the heat liquefied asphalt is taken into the by-pass lines 43 and 44. Preferably the air trap 47 is provided with a vent 48 from which any air which may accumulate therein may be automatically vented, as under the influence of a float valve 49. However, a manually operated vent port 50 may also be provided for venting air from time to time as may be desired. A pressure gauge 51 is advantageously associated with the air trap 47 so as to indicate the pressure maintained on the high pressure side of the gear pump 36. The air trap has the function of removing from the heat liquefied asphalt being recirculated through the gear pump 36 any entrapped air which may become accumulated therein. Under the high pressure to which the heat liquefied asphalt is subjected such entrapped air tends to become separated from the heat liquefied asphalt and by the employment of the air trap in the combination, disturbances which otherwise might occur in connection with the functioning of the gear pump and in connection with the functioning of the pressure relief valves in the by-pass lines are successfully overcome.

The gear pump 36, the by-pass lines 43 and 44, the pressure relief valves 45 and 46, the air trap 47, and the container 39 containing strainer 40 form a compact unit that is enclosed within a common casing 51 which preferably includes thermal insulation 52 in the walls thereof. The casing 51 is provided with a removable cover 53. Suitable means is provided for heating the atmosphere within the casing 51 and preferably the heating means is of such character as to maintain substantially constant a predetermined superatmospheric temperature within the casing 51. For example, in handling ordinary paving asphalt the atmosphere within the casing 51 may be maintained at a temperature of about 275° F. In the embodiment shown the atmosphere within the casing 51 is heated by the electrical heating elements 54 and the action of the heating elements 54 may be thermostatically controlled by the thermostat 55 which is disposed within the casing 51. The circuit arrangement for maintaining a constant temperature within the casing 51 will be described hereinbelow in connection with the wiring diagram shown in Fig. 10. If the interior of the casing 51 is sealed off from the outside atmosphere completely the distribution of the heat within the casing is not entirely uniform and it is preferable, therefore, to provide openings 56 adjacent the bottom of the casing 51 as well as one or more openings 57 adjacent the upper portion of the casing as, for example, by having the opening 57 in the cover 53 as shown, so as to cause a certain amount of circulation of air through the casing and setting up of convection currents therein, thus more equally distributing the heat within the casing. While it is normally preferable to employ electrical heating means to heat the atmosphere within the casing 51 any other heating means may be employed. For example, the casing 51 can be made of relatively heavy construction and sealed from the outside atmosphere so that steam under high pressure can be maintained therein when introduced and withdrawn through suitable inlet or outlet means (not shown).

The container 39 is such that it contains a body of asphalt whose thickness is at least as great as the thickness of the asphalt carried within the other parts enclosed in the casing 51 including the gear pump, the by-pass lines, the pressure relief valves and the air trap. Projecting within the container 39 is the thermal sensitive element of the thermostat 58 which is responsive to variations of temperature of the body of asphalt within the container 39. The thermostat 58 is operatively connected to the supply of motive power for the motor 59 which is operatively connected to the gear pump 36 by the shaft 60. The motor 59 is outside the casing 51 as shown so that the motor will not be affected by the heat within the casing 51. The thermostat 58 is such that when the temperature of the body of asphalt within the container 39 is below a predetermined temperature the supply of power to the motor 59 will be cut off and the motor 59 will not operate. For example, the thermostat 58 may be set to cut off the power to the motor 59 when the temperature of the body of asphalt within the container 39 is below 250° F. and too heavy and viscous for proper handling by the gear pump 36 and the other parts of the apparatus. Since the thickness of the body of asphalt within the container 39 is at least as great as that of the asphalt in any of the other parts of the apparatus within the casing 51, proper fluidity of the asphalt in the apparatus within the casing 51 is effected when the temperature of the asphalt within the container 39 is such that the thermostat 58 permits operation of the motor 59. Because the by-pass lines between the inlet and outlet of the gear pump 36 are entirely within the casing 51 it is apparent that the action of the thermostat 58 is such that the motor is permitted to operate only when the asphalt contained in the parts within the casing 51 is at such temperature that the gear pump can be safely operated with by-passing properly liquefied asphalt between the outlet and inlet of the gear pump. Moreover, the setting of the thermostat 58 controls the temperature of the asphalt acted upon by the gear pump so that the asphalt cannot be supplied to the atomizer nozzles unless it is at the desired temperature for accomplishing effective atomization by the atomizing nozzles under the pressure at which the unit is set to operate.

A suitable circuit for controlling the mechanisms contained in the casing 51 is illustrated in Fig. 10. The circuit as illustrated is a three phase circuit supplied from an outside source by the lines 61a, 61b and 61c. Electric current for supplying heat to the heating elements 54 within the casing 51 is directed thereto by the lines 62a, 62b and 62c containing the fuses 63. The current passing to the heating elements 54 is controlled by the normally open multiple switch 64. The switch 64 is adapted to be automatically closed by energizing the solenoid 65 in the line 66a which is connected to the terminal 67 in line 62a and to the normally closed thermostat 55 which, as shown in Fig. 3, has a thermal sensitive element disposed in contact with the atmosphere within the casing 51. The circuit through the solenoid 65 and thermostat 55 is completed by the line 66b which is connected to the terminal 68 in the line 62c. The thermostat 55 is normally closed when the temperature of the atmosphere within the casing 51 is below a predetermined temperature such as 275° F. and when the thermostat 55 is closed the solenoid 65 is energized to actuate the multiple switch 64 for completing the circuit to the heating elements 54. However, when the temperature of the atmosphere within the casing 51 rises above 275° F. the thermostat 55 opens thus de-energizing the solenoid 65 and permitting the multiple switch 64 to automatically open so as to cut off the supply of energy to the heating elements 54.

The multiple switch 70 is manually operable to shut off the supply of current from the lines 61a, 61b and 61c to the lines 69a, 69b and 69c leading to the motor 59 when the apparatus is not in use. Appropriate fuses 71 may be included in the lines 69a, 69b and 69c. The current taken to the motor 59 by the lines 69a, 69b and 69c is controlled by the normally open multiple switch 72 which is adapted to be actuated by the solenoid 73 in the control circuit containing the normally open thermostat 58 and containing the start and stop button switches 74a and 74b respectively. The control circuit for actuating the solenoid 73 comprises the line 75 between the terminal 76 in the line 69b and the thermostat 58. The line 76 is connected between the thermostat 58 and the normally closed stop button switch 74b. The multiple switch 72 also controls the line 77 between the normally open start button switch 74a and the terminal 78 in the line 69c. The line 79 is connected between the terminal 78 and the normally closed stop button switch 74b and to the normally open start button switch 74a. The multiple switch 72 is normally open so as to cut off supply of current to the motor 59 and through the line 77. The thermostat 58 is thermally responsive to the temperature of the asphalt within the container 39 and is normally open when the temperature in the container 39 is below a predetermined temperature such as 250° F. and so long as the temperature of the asphalt within the container 39 is below the predetermined temperature, the motor 59 cannot be started. However, when the temperature of the asphalt within the container 39 rises above the predetermined temperature then the motor 59 can be started by pressing the normally open start button switch 74a to complete the circuit through the solenoid 73 for actuating the multiple switch 72 so as to complete the circuit leading to the motor 59 and so as to complete the circuit through the normally closed stop button switch 74b. The motor will then continue to operate so long as the thermostat 58 remains closed or until the normally closed stop button switch 74b is pressed so as to break the circuit leading through the solenoid 73. While the thermostat 58 remains closed the motor can be immediately stopped by pressing the normally closed stop button switch 74b and started again by pressing the normally open start button switch 74a.

If it should be desired to operate the motor when the material in the container 39 is at a relatively low temperature as, for example, in the handling of a normally fluid flux oil or the like, the thermostat 58 can be taken out of the circuit for controlling the multiple switch 72 by closing the switch 80 in the shunt line 81 around the thermostat 58. In normal operation of the apparatus for handling conventional paving asphalt or the like, which is relatively solid at ordinary temperatures, the switch 80 is open so that the motor 59 cannot be operated until the temperature of the asphalt within the container 39 has been brought to such a temperature as to accomplish the closing of the thermostat 58. If desired a safety switch 82 may be employed in the control circuit for actuating the multiple switch 72, this switch being closed during normal operation of the apparatus.

The apparatus above described provides means for supplying a plastic such as paving asphalt under a constantly maintained very high pressure and at a temperature such that the plastic is sufficiently fluid to accomplish desired atomization under the pressure which is maintained. Further features of this invention relate to the means for handling the heat liquefied plastic in an effective manner for accomplishing atomization.

In the embodiment shown in Figs. 1, 2, 3, 5 and 6 two atomizer-carrying manifolds 83a and 83b are employed. The heat liquefied asphalt is directed to these manifolds by the line 84 which is connected to the outlet 38 of the gear pump. In the line 84 there is disposed a one way valve 85 which is adapted to permit passage of heat liquefied asphalt to the manifolds, but which is adapted to prevent back flow of fluid from the manifolds into the line 84. Preferably the one way valve 85 is such that no flow of heat liquefied asphalt is permitted to pass from the line 84 into the manifolds until a predetermined pressure is reached as, for example, 40 pounds per square inch; namely, a pressure which is substantially lower than the back pressure afforded by either of the pressure relief valves in the by-pass lines between the outlet and inlet of the gear pump. In this way any flow of asphalt from the line 84 to the manifolds is prevented unless a substantial pressure occurs in the line 84, thus minimizing any tendency for the heat liquefied asphalt to drip from the atomizer nozzles when the pressure produced by the gear pump is dropped upon completing the atomization of a desired amount of heat liquefied asphalt by virtue of the action of the valve 85 in immediately closing off the line 84 as soon as the pressure supplied by the gear pump falls below the predetermined pressure for which the valve 85 is set, thus effecting substantially instantaneously the final pressure drop, e. g., from 40 pounds to atmospheric pressure, in the region between the valve 85 and the atomizer nozzles. If the valve 85 were not employed the tendency to continued flow of the heat liquefied asphalt due to such factors as the momentum of the flow of liquid and of the mechanical parts and gravity would be such that the final pressure drop at the nozzles would be much more gradual, thus inducing drip and other release of improperly atomized asphalt into the mixer and also adversely affecting the closeness of the control of the amount of asphalt that is supplied to a batch. The action of the valve 85 in completely shutting off the line 84 as soon as the pressure drops to the pressure for which the valve is set also is beneficial in preventing any further flow which would have the effect of permitting air to get into the portion of the system on the pump side of the valve 85, and of keeping the parts fully primed so that when the next charge of asphalt is to be atomized the full pressure supplied by the gear pump, e. g. 300 pounds per square inch, may be imposed at the atomizer nozzles within a small fraction of a second. The heat liquefied asphalt which is permitted to pass the one way valve 85 is directed to the manifolds 83a and 83b by the lines 86a and 86b which are controlled respectively by the manually operable shutoff valves 87a and 87b.

The line 88 is connected with a source of steam maintained under pressure such as 175 pounds per square inch. Steam from this line is directed into the manifolds 83a and 83b by the lines 89a and 89b. The lines 89a and 89b contain the one way valves 90a and 90b respectively which are adapted to permit passage of steam from the line 88 into the manifold 83a and 83b, but which prevent passage of asphalt from the manifolds 83a or 83b into the steam line 88. Preferably the one way valves 90a and 90b are such that steam cannot be passed into the manifolds 83a and 83b except when a predetermined steam pressure is obtained as, for example, 20 pounds per square inch. The lines 89a and 89b are preferably likewise controlled by the manually operable shutoff valves 91a and 91b.

In normal operation of the apparatus when both of the manifolds 83a and 83b are employed, the manually operable shut-off valves 87a and 87b are left open and the manually operable shut-off valves 91a and 91b are closed. In normal operation of the apparatus the mixer is successively charged with weighed batches of aggregate to be coated and a predetermined amount of heat liquefied asphalt at the desired temperature and pressure is discharged from the manifolds through the atomizer nozzles for coating the aggregate in the mixer, the supply of heat liquefied asphalt under pressure then being cut off. The one-way valve 85 promotes the sharp shutting off of the asphalt since no asphalt is permitted to pass by the valve 85 when the pressure falls below a predetermined pressure such as 40 pounds per square inch. As soon as the aggregate in the mixer is coated it can be quickly dumped and the mixer charged with a fresh supply of aggregate to be coated.

Since the time interval is short for emptying the mixer and charging a fresh batch of aggregate therein, the parts of the apparatus do not become cooled and the apparatus will be in condition for supplying another charge of atomized asphalt to the fresh batch of aggregate to be coated. However, if it is desired to shut down the apparatus for more than a short period of time then it becomes desirable to clear the atomizer nozzles. Under such conditions the manually operable shut-off valves 91a and 91b are opened, and since the steam pressure in the line 88 is substantially lower than the pressure under which the heat liquefied asphalt is introduced into the manifolds 83a and 83b, no steam will enter the manifolds 83a and 83b as long as the heat liquefied asphalt in the manifolds 83a and 83b is supplied under pressure. However, as soon as the supply of heat liquefied asphalt under pressure is discontinued the steam is permitted to pass the one-way valves 90a and 90b so as to enter the manifolds 83a and 83b and so as to clear the spray nozzles of the heat liquefied asphalt thus effectively preventing any clogging of the nozzles. The steam in such case cannot go beyond the one-way valve 85 in the line 84. If the one-way valve 85 were not present in the line 84 to prevent the steam from going beyond it during scavenging of the spray bars, the steam entering the rest of the system would cause foam and prevent high pressure operation of the gear pump until the foam had been dissipated. If desired, the arrangement is such that the shutoff valves 91a and 91b can be left open at all times so as to accomplish a steam scavenge of the atomizer nozzles after each charge of heat liquefied asphalt, but as aforesaid this is not necessary when the time interval between successive charges of atomized asphalt is relatively short and is insufficient to result in substantial solidification of the asphalt in the atomizer nozzles.

The manifolds 83a and 83b are preferably disposed within a casing 92 having an inlet 93 and an outlet 94 so that a heating fluid such as steam under superatmospheric pressure may be maintained in the casing 92 for heating the manifolds 83a and 83b and the connections to the spray nozzles whose mouths are disposed on the outside of the casing 92 for atomization of heat liquefied asphalt into the upper region of the mixer wherein the aggregate particles are projected upwardly by the action of the mixer blades of the mixer. The manifolds 83a and 83b and the connections to the spray nozzles can, if desired, be heated in any other suitable way, as by use of electrical heating means.

Another feature of this invention relates to the means for connecting the atomizer nozzles with the manifolds 83a and 83b. One such means is shown in detail in Figs. 5 and 6, with specific reference to the manifold 83a, the construction of the manifold 83b being similar. Each of the atomizer nozzles 95 is connected to the lower end of a tube 96 that passes through the lower portion of the manifold 83a so that its open upper end is adjacent the upper surface of the interior of the manifold. It is important to control as accurately as possible the quantity of asphalt which is charged into the mixer for any given batch of coated aggregate to be prepared. It is also important that virtually all of the heat liquefied asphalt be introduced in an atomized condition. As soon as the very high pressure necessary for atomization falls off the heat liquefied asphalt is no longer atomized and if heat liquefied asphalt is permitted to pass through the atomizer nozzles while not under the influence of very high pressure it will drop into the mixer in the form of drops or blobs of substantial size. By the construction above mentioned, any further discharge of asphalt after the atomization pressure has been relieved is minimized inasmuch as only a very small amount of asphalt in the upper portion of the manifold 83a above the upper end of the tubes 96 can flow out through the atomizer nozzles 95. Any such further discharge of heat liquefied asphalt in unatomized condition can also be further minimized by inclusion in the tube 96 of a check valve 97 under the influence of the spring 98 which shuts off any tendency for heat liquefied asphalt to drop from the atomizer nozzles 95 after the pressure in the manifold 83a has been relieved. The check valve 97 may be employed, without having the tubes 96 extend upwardly within the interior of the manifold 83a so as to prevent drip, but the extension of the tube 96 so as to be adjacent the upper portion of the interior of the manifold 83a is preferable in preventing drip and also is preferable in that the spray nozzles 95 and the tubes 96 may be scavenged with steam without emptying the bulk of the heat liquefied asphalt contained in the manifolds which, if discharged, would present difficulties both from the point of view of disposing of it and from the point of view or properly controlling the amount of the asphalt to be charged in the mixer for the next succeeding coating operation.

It is not essential according to this invention to use more than one atomizer-carrying manifold. Thus, it is apparent that the manifold 83b can be cut out of operation altogether by closing the manually operable shutoff valves 87b and 91b. In such case, the manifold 83a alone would be used. Alternatively, the manifold 83a can be closed off from operation and only the manifold 83b employed. However, by setting up the apparatus so as to contain a plurality of manifolds, greater flexibility in operation can be afforded. For example, the orifices of the atomizer nozzles carried by the manifold 83a may be of somewhat larger diameter as compared with the atomizer nozzles carried by the manifold 83b so as to discharge heat liquefied asphalt in atomized condition from the manifold 83a at a greater rate as compared with the rate at which heat liquefied asphalt is atomized from the manifold 83b. For different paving mixes the amount of heat liquefied asphalt used may be substantially different. Thus, for certain mixes the proportion of asphalt for coating the aggregate may be in the neighborhood of 4 or 5%, particularly when coarse aggregates are being handled. On the other hand for sheet asphalt surfacing or the like employing fine aggregates such as sand, the proportion of asphalt may be around 12% or more. In each contingency, however, it is desirable that the time during which the atomized asphalt is added be short and be consistent with affording the best application time for producing the most effective coating job. Moreover, best results are usually obtained when the time during which the atomized asphalt is added is approximately the same regardless of the amount that is incorporated. Accordingly, when the proportion of asphalt to be added is on the high side both manifolds may be used. However, if the amount of asphalt to be added is on the low side, then only one manifold may be used and that manifold may be used which carries the atomizer nozzles having the smaller diameter openings. For an intermediate amount of asphalt only one manifold may be used, but that manifold may be selected which contains the atomizer nozzles having the larger diameter openings. In this way, the mixing time required for proper coating of the aggregate particles as acted upon by the mixer can be regulated so as to afford optimum coating conditions for different proportions of atomized heat liquefied asphalt to be applied to the aggregate particles.

It is to be noted that when both of the manifolds 83a and 83b are employed, the atomizer nozzles are carried by the manifolds so as to be in laterally spaced staggered relation. The atomized asphalt discharged from each atomizer nozzle is in the form of a cone and it is preferable to minimize as much as possible impingement of the atomized asphalt in one cone upon the atomized asphalt in an adjacent cone, for such impingement tends to result in coalescence of the atomized particles with formation of droplets that are undesirable from the standpoint of effecting proper coating of the aggregate. By arranging the atomizer nozzles in laterally spaced staggered relation, such impingement of the cones of atomized asphalt discharged by the atomizer nozzles can be minimized while at the same time concentrating the discharge of atomized asphalt in the desired effective location which is the point in the upper portion of the mixer where the aggregate particles are projected upwardly by the action of the mixer blades between the shafts of the mixer. For coating paving aggregate with heat liquefied paving asphalt in an atomized condition it is usually preferable that the atomizer nozzles be spaced apart approximately 10 inches with the atomizer nozzle approximately 12 inches above the uppermost extent of the tips of the mixer blades. By the staggered arrangement aforesaid, such spacing of the nozzles can be afforded both as regards the nozzles carried by each individual manifold and as regards the nozzles carried by both of the manifolds.

In Figs. 7, 8 and 9, an alternative means for connecting the atomizer nozzles with the manifolds is shown and the detail showing in these figures has been indicated as applicable to the manifold 83a. As shown in Figs. 7, 8 and 9, the arrangement is such as to be appropriate in an apparatus wherein only a single manifold is employed while still obtaining the benefit of having the atomizer nozzles disposed in laterally spaced staggered relation. In the embodiment shown in Figs. 7, 8 and 9, the atomizer nozzles 95 communicate with the interior of the manifold 83a by the tubes 99 which enter the manifold 83a at the top thereof. In this way, any tendency for heat liquefied asphalt contained in the manifold to drip out from the atomizer nozzles 95 after the pressure in the manifold is dropped is completely prevented. If it is also desired to prevent dripping of asphalt from the tubes 99 and from the atomizer nozzles 95, the check valves 97, shown in detail in Fig. 6, may be included in the tubes 99 immediately above the atomizer nozzles 95. The manifold shown in Figs. 7, 8 and 9, would be similarly disposed within a casing 92, e. g. as shown in Figs. 1, 2, and 3, and with protrusion of the atomizer nozzles from the bottom of the casing as hereinabove described. By taking off the tubes 99 alternately on opposite sides of manifold 83a, the atomizer nozzles 95 may be disposed in laterally spaced staggered relation for the purposes mentioned above and such construction is preferable when only a single manifold is used in the apparatus. However, if it is desired to employ two manifolds, e. g. manifolds 83a and 83b, then the tubes 99 may all be taken off on one side only of each of the manifolds so that the atomizer nozzles carried by each of the manifolds will be arranged in laterally spaced staggered relation as described hereinabove in connection with Figs. 1, 2 and 3.

Typical operation of the apparatus will now be described. Assuming that the apparatus has been shut down over night after operations on the previous day, the various parts of the apparatus, except for the atomizer nozzles and the tubes communicating therewith which will have been cleared after the previous day's operations, will contain asphalt which has become cooled and relatively solid. By introducing heating fluid such as steam into the casing 92 about the manifolds 83a and 83b the asphalt in these manifolds can be brought to a sufficiently high temperature to be discharged in an atomized condition. By closing the switch 70 communicating with the power lines 61a, 61b and 61c, the heating elements 54 in the casing 51 are immediately energized so as to heat the atmosphere within the casing to a temperature such as 275° F. and the action of the thermostat 55 will keep the atmosphere within the casing at the desired temperature. The parts within the casing 51 are thus heated, including asphalt which is contained therein. It usually requires about 45 minutes or so to bring the body of asphalt within the container 39 up to a temperature of about 250° F. and until such temperature is reached the motor 59 cannot be operated inasmuch as the thermostat 58 effectively cuts off the supply of the current to the motor. However, as soon as the body of asphalt in the container 39 attains a temperature of 250° F., which is a safe temperature for operation of the gear pump, the motor 59 can be started by pressing the normally open start button switch 74a. Upon starting the motor 59 the asphalt acted upon by gear pump 36 will be circulated through the by-pass line containing the pressure relief valve which determines the operating pressure on the high pressure side of the pump and such pressure will be maintained at the outlet of the pump. However, no heat liquefied asphalt can pass into the manifolds 83a and 83b as long as the shutoff valve 42 in the line 41 is closed and so long as the shutoff valves 87a and 87b leading to the manifolds are closed.

When it is desired to apply the atomized heat liquefied asphalt to aggregate in the mixer a weighed quantity aggregate is charged into the mixer and the operation of the mixer is started. Preliminary to these operations, heat liquefied asphalt will have been introduced into the weigh bucket 34. Either or both of the manually operable valves 87a and 87b are then opened and as soon as the valve 42 in the line 41 leading from the weigh bucket is opened heat liquefied asphalt under high pressure will be charged into either or both of the manifolds 83a and 83b for discharge from the atomizer nozzles. When the desired predetermined amount of asphalt has been removed from the weigh bucket 34 further atomization of the asphalt can be immediately stopped either by closing the valve 42 or by stopping the motor 59. Thereupon, the aggregate which has become coated in the mixer can be dumped from the mixer.

If further successive batches are to be mixed with a short interval of time between each batch the valves 91a and 91b which close off the manifolds 83a and 83b from the steam line 88 are kept closed and the successive batches of heat liquefied asphalt may be charged into the mixer either by stopping and starting the motor 59 or by keeping the motor 59 in continuous operation and by opening and closing the valve 42 in the line 41 leading to the weigh bucket. When it is desired to close down the operation of the apparatus as, for example, overnight, the valves 91a and 91b which control the steam line 88 leading to the manifolds 83a and 83b can be opened and immediately after the conclusion of the last charge of atomized asphalt the steam will enter either or both of the manifolds 83a and 83b, depending upon whether one or both of the manifolds have been used, and will scavenge the spray nozzles and the parts leading thereto so as to prevent the spray nozzles from becoming plugged up when the next operation is to be carried out.

The foregoing operation of the apparatus has been described from the standpoint of operations as they are normally carried out from day to day. Of course, if the apparatus is empty of asphalt it will be necessary to introduce asphalt in a liquefied condition into the system so as to fill the parts before mixing operations are carried out which requires the incorporation of predetermined quantities of asphalt. Similarly, if the character of the asphalt that is used is to be changed, this requires feeding the different type of asphalt through the apparatus so as to change the type of asphalt contained in the apparatus parts. As aforesaid, by closing the switch 80 in the shunt line 81, the apparatus can be used in handling liquids which are fluid when at normal temperatures or when only mildly heated. This is desirable for in connection with certain types of paving work it is sometimes desirable to use the apparatus for atomizing a flux oil which is fluid when at normal temperatures or when only mildly heated as distinguished from the usual type of paving asphalt appropriate for hot mix operations which requires heating to a temperature of the order of 225° F. to 350° F. Depending upon the softening point of the asphalt or other material which is handled, the settings of the thermostats can be adjusted and the settings of the pressure relief valve can be adjusted so as to maintain the desired temperature and pressure conditions for obtaining most effective atomization.

While certain portions of the apparatus such as the line 41, line 84, the one-way valve 85, the lines 86a and 86b and the shutoff valve 87a and 87b have been shown without employment of any means for keeping these parts heated, it is to be understood that this has been done primarily from the standpoint of clarity in the drawings and that suitable means may be employed for keeping the parts in question at a desired temperature for obtaining or maintaining proper liquefaction of the asphalt or the like contained therein. Thus jacket means, such as casing 92 about the manifolds, may be employed about these parts. Alternatively, electric heating elements may be employed either alone or in conjunction with thermal insulation in order to maintain the parts at the desired temperature. The foregoing also applies to the weigh bucket 34 which preferably has associated therewith some means to keep the contents thereof in a heat liquefied condition.

While the apparatus of this invention has been illustrated in connection with the supplying of atomized asphalt to aggregate particles contained in the mixer appropriate for preparing paving mixes it is apparent that the apparatus may be employed whenever it is desired to accomplish atomization, especially as regards materials such as paving asphalt whose successful atomization is difficult to accomplish by ordinary means. Moreover, while reference has been made to the atomization of material such as paving asphalt, other thermoplastics may be successfully atomized by the apparatus. The apparatus has such flexibility that it can be used not only for atomizing plastics having a relatively high softening point, but also materials which have a lower softening point or which may be normally fluid at atmospheric temperatures. Moreover, while certain typical embodiments of the apparatus have been specifically shown and described herein, it is to be understood that this has been for illustrative purposes and that the apparatus may be varied in accordance with the novel features and principles of construction that have been described.

I claim:

1. Apparatus for atomizing heat liquefied asphalt for application to aggregate particles, said apparatus comprising in combination a gear pump having an inlet and an outlet, a container adjacent said gear pump, a strainer within said container disposed for straining heat liquefied asphalt directed through said container, means for directing heat liquefied asphalt from said container to said inlet of said gear pump, a by-pass line communicating between said outlet and said inlet of said gear pump for passage of heat liquefied asphalt from said outlet to said inlet without passage through said strainer in said container, a pressure relief valve in said by-pass line adapted for permitting passage of heat liquefied asphalt through said by-pass line from said outlet to said inlet of said gear pump while maintaining substantialy constant a predetermined pressure on the high pressure side of said gear pump, an air trap in communication with said outlet of said gear pump, vent means for venting air from said air trap, a common casing disposed about said gear pump, said container, said by-pass line, said pressure relief valve and said air trap, means for maintaining the atmosphere within said casing substantially at a predetermined superatmospheric temperature, a motor outside of said casing operatively connected to said gear pump, power supply means for supplying motivating power to said motor, thermal control means operatively arranged with said power supply means to cut off motivating power for said motor responsive to temperature of asphalt in said container below a predetermined superatmospheric pressure, means for directing heat liquefied asphalt from a source of heat liquefied asphalt to said container for passage through said strainer and to said inlet of said gear pump, an atomizer-carrying manifold, a plurality of atomizer nozzles, conduit means communicating between said atomizer nozzles and the upper portion of the interior of said atomizer-carrying manifold, means for heating said atomizer-carrying manifold, a conduit communicating between said outlet of said gear pump and said atomizer-carrying manifold, a one way valve adapted to permit passage of heat liquefied asphalt from said outlet of said gear pump to said manifold and to prevent passage of fluid in the opposite direction, a steam line communicating with the interior of said manifold and adapted to admit steam into said manifold from a source of steam under superatmospheric pressure, a one way valve in said steam line adapted to permit passage of steam through said steam line from said source of steam to said manifold and to prevent passage of fluid in the opposite direction, a shutoff valve in said steam line optionally operable to shut off passage of steam through said steam line to said manifold, and means for instituting and shutting off the supply of heat liquefied asphalt to said atomizer-carrying manifold from said gear pump.

2. Apparatus according to claim 1 which includes means for measuring the amount of heat liquefied asphalt directed to said container by said means for directing heat liquefied asphalt to said container from a source of heat liquefied asphalt.

3. Apparatus for atomizing heat liquefied asphalt comprising a positive displacement rotary pump having an inlet and an outlet, a strainer adjacent said pump, means for directing heat liquefied asphalt from said strainer to said inlet of said pump, a by-pass line communicating between said outlet and said inlet of said pump, a pressure relief valve in said by-pass line for permitting passage of heat liquefied asphalt through said by-pass line from said outlet to said inlet of said pump while maintaining substantially constant a predetermined pressure on the high pressure side of said pump, an air trap in communication with said outlet of said pump, vent means for venting air from said air trap, a common casing disposed about said pump, said strainer, said by-pass line, said pressure relief valve and said air trap, means for maintaining the atmosphere within said casing substantially at a predetermined superatmospheric temperature, a motor outside said casing operatively connected to said pump, atomizer nozzle means, means for directing heat liquefied asphalt under pressure from said outlet of said pump to said atomizer nozzle means, and means for directing heat liquefied asphalt to said strainer for passage therethrough to said inlet of said pump.

4. Apparatus for supplying a heat liquefied thermoplastic under pressure to an atomizer nozzle comprising a rotary positive displacement pump having an inlet and an outlet, a by-pass line communicating between said outlet and said inlet, a pressure relief valve in said by-pass line adapted to maintain a predetermined pressure on the high pressure side of said pump, a container adapted to contain a body of said plastic whose thickness is at least as great as that of plastic contained in any of the parts of said pump, said by-pass, and said pressure relief valve, a common casing disposed about said pump, said by-pass line, said pressure relief valve and said container, means for heating the atmosphere within said casing, means for directing through said container plastic acted upon by said pump, means for directing heat liquefied plastic to said inlet of said pump, a motor for operating said pump, thermal responsive means disposed within said container, and means associated with said thermal responsive means for controlling the supply of actuating power to said motor so as to cut off said supply of power when the temperature of plastic within said container is below a predetermined temperature.

5. Apparatus for supplying a heat liquefied plastic under pressure to an atomizer nozzle comprising a gear pump having an inlet and an outlet, an air trap above and adjacent said outlet and communicating therewith, a by-pass line for directing heat liquefied plastic from said outlet to said inlet and communicating with said outlet in spaced relation to said gear pump at least as great as the communication of said air trap with said outlet, a pressure relief valve in said by-pass line adapted to maintain a predetermined pressure on the high pressure side of said pump, means for heating said pump, said air trap, said by-pass line and said pressure relief valve, and means for directing heat liquefied plastic to said inlet of said pump.

6. Apparatus according to claim 5 which also comprises a second by-pass line communicating between said outlet and said inlet, and a pressure relief valve in said second by-pass line adapted to maintain a predetermining pressure on the high pressure side of said pump substantially greater than that maintained by said pressure relief valve in said other by-pass line.

7. Apparatus for supplying heat liquefied plastic under high pressure to an atomizer nozzle comprising a rotary positive displacement pump having an outlet and an inlet, a by-pass line communicating between said outlet and said inlet, a pressure relief valve in said by-pass line adapted to maintain a predetermined super-atmospheric pressure on the high pressure side of said pump, a common casing about said pump, said by-pass line and said pressure relief valve, means for heating the atmosphere within said casing, means for directing heat liquefied plastic from the exterior of said casing to said inlet, and means for directing heat liquefied asphalt from said outlet outside of said casing for supplying an atomizer nozzle with the heat liquefied plastic, said heating means being adapted to maintain the temperature of the atmosphere within said casing substantially constant at a predetermined superatmospheric temperature and which comprises means for operating said pump and thermal responsive means that is directly responsive to the temperature of plastic material contained in a part within said casing that is in open communication with said pump and that is adapted to stop the operation of said pump when the temperature of the plastic in said part is below a predetermined superatmospheric temperature.

8. Apparatus for atomizing a liquid which comprises a pump having an outlet and an inlet, a manifold, a plurality of atomizers connected to said manifold, a conduit for directing liquid from said outlet to said manifold, a valve in said conduit adapted to open to permit passage of liquid through said conduit from said outlet to said manifold responsive to pressure supplied by said pump in excess of a predetermined pressure and to close to prevent passage of liquid through said conduit from said outlet to said manifold responsive to lowering of said pressure below said predetermined pressure, means for directing liquid to the inlet of said pump, and means for controlling the duration of the supply of liquid by said pump at a pressure in excess of said predetermined pressure for passage from the outlet of said pump through said valve into said manifold.

9. Apparatus for atomizing a heat liquefied plastic comprising a pump having an outlet and an inlet, a by-pass line communicating between said outlet and said inlet, a pressure relief valve in said by-pass line adapted to maintain a predetermined superatmospheric pressure on the high pressure side of said pump, means for directing heat liquefied plastic to the inlet of said pump, manifold means, a plurality of atomizer nozzles, means for directing heat liquefied plastic from said manifold means to said atomizer nozzles, conduit means for directing heat liquefied asphalt from said outlet of said pump to said manifold means, a one way valve in said conduit means adapted to permit passage of fluid in said conduit means only in the direction from said outlet to said manifold means, a steam line communicating with the interior of said manifold means, and a one way valve in said steam line adapted to permit flow of fluid in said steam line only in the direction for flow of fluid from said steam line into said manifold means.

10. Apparatus according to claim 9 wherein said one way valve in said conduit means is a pressure relief valve adapted to maintain a substantial back pressure on the high pressure side of said pump that is substantially less than the back pressure provided by said pressure relief valve in said by-pass line and wherein said one way valve in said steam line is a pressure relief valve adapted to maintain a substantial back pressure in said steam line that is substantially less than the back pressure provided by said one way valve in said conduit means.

11. In apparatus for atomizing heat liquefied plastic, a manifold, a plurality of atomizer nozzles communicating with said manifold, a supply line for directing heat liquefied plastic into said manifold, a one way valve in said supply line adapted to permit passage of fluid in said supply line only in the direction toward said manifold, a steam line for directing steam into said manifold, and a one way valve in said steam line adapted to permit passage of fluid in said steam line only in the direction toward said manifold each of said one-way valves remainining normally closed except under the influence of fluid pressure of permitted flow in excess of a predetermined minimum fluid pressure for each of said one-way valves, the minimum fluid pressure required for opening the one-way valve in the plastic supply line being substantially greater than the minimum pressure required for opening the one-way valve in the structure.

12. Apparatus for supplying heat liquefied plastic material under pressure to an atomizer nozzle which comprises a rotary positive displacement pump having an outlet and an inlet, a by-pass line communicating between said outlet and said inlet, a pressure relief valve in said by-pass line adapted to maintain a predetermined superatmospheric pressure on the high pressure side of said pump, a power supply means for operating said pump, means for shutting off the power supplied to said pump by said power supply means responsive to temperature of plastic material acted upon by said pump falling below a predetermined superatmospheric temperature, means for directing heat liquefied plastic to said inlet of said pump, and means for directing heat liquefied plastic from the outlet of said pump to an atomizer nozzle.

References Cited in the file of this patent

UNITED STATES PATENTS

| Number | Name | Date |
| --- | --- | --- |
| 937,660 | Tomer | Oct. 19, 1909 |
| 1,062,029 | Pillsbury | May 20, 1913 |
| 1,694,806 | Yale | Dec. 11, 1928 |
| 1,743,245 | Smith | Jan. 14, 1930 |
| 1,984,851 | Vinz | Dec. 18, 1934 |
| 2,045,164 | Richards | June 23, 1936 |
| 2,123,156 | Jagoe | July 5, 1938 |
| 2,149,660 | Blood | Mar. 7, 1939 |
| 2,152,407 | Fawley | Mar. 28, 1939 |
| 2,529,656 | Hettelsafer | Nov. 14, 1950 |
| 2,658,796 | Kopperschmidt | Nov. 10, 1953 |